Oct. 18, 1966  R. F. BRISBIN ETAL  3,279,824
TRUCK HITCH
Filed Sept. 24, 1964  3 Sheets-Sheet 1
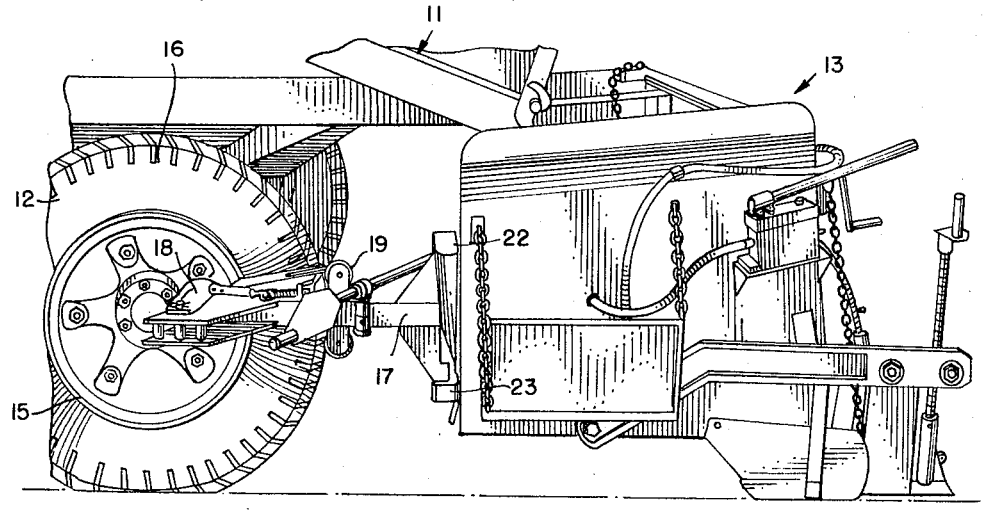
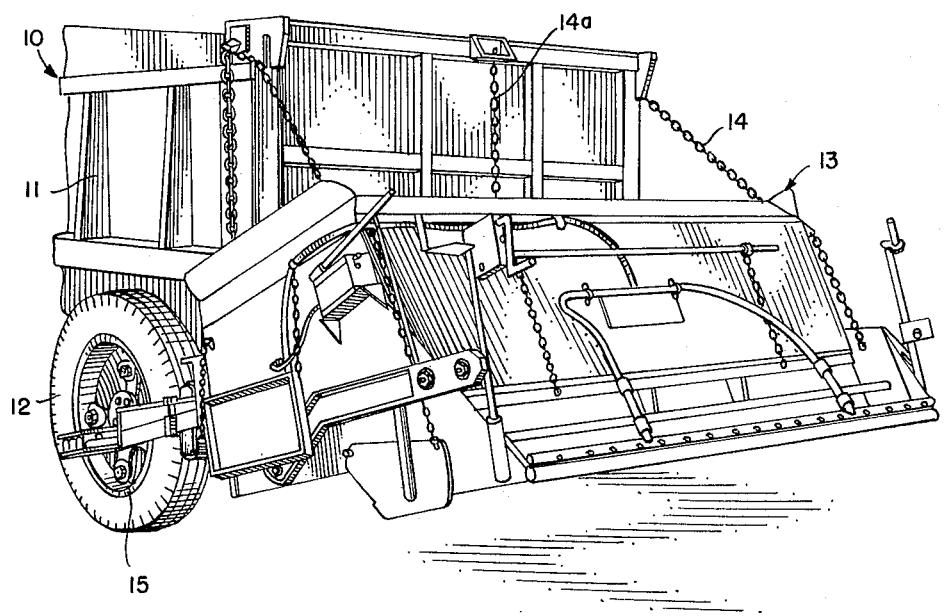
INVENTORS:
RICHARD F. BRISBIN
EDWARD J. SEDLACEK
BY Dawson, Tilton, Fallon, Lungmus & Alexander
ATT'YS

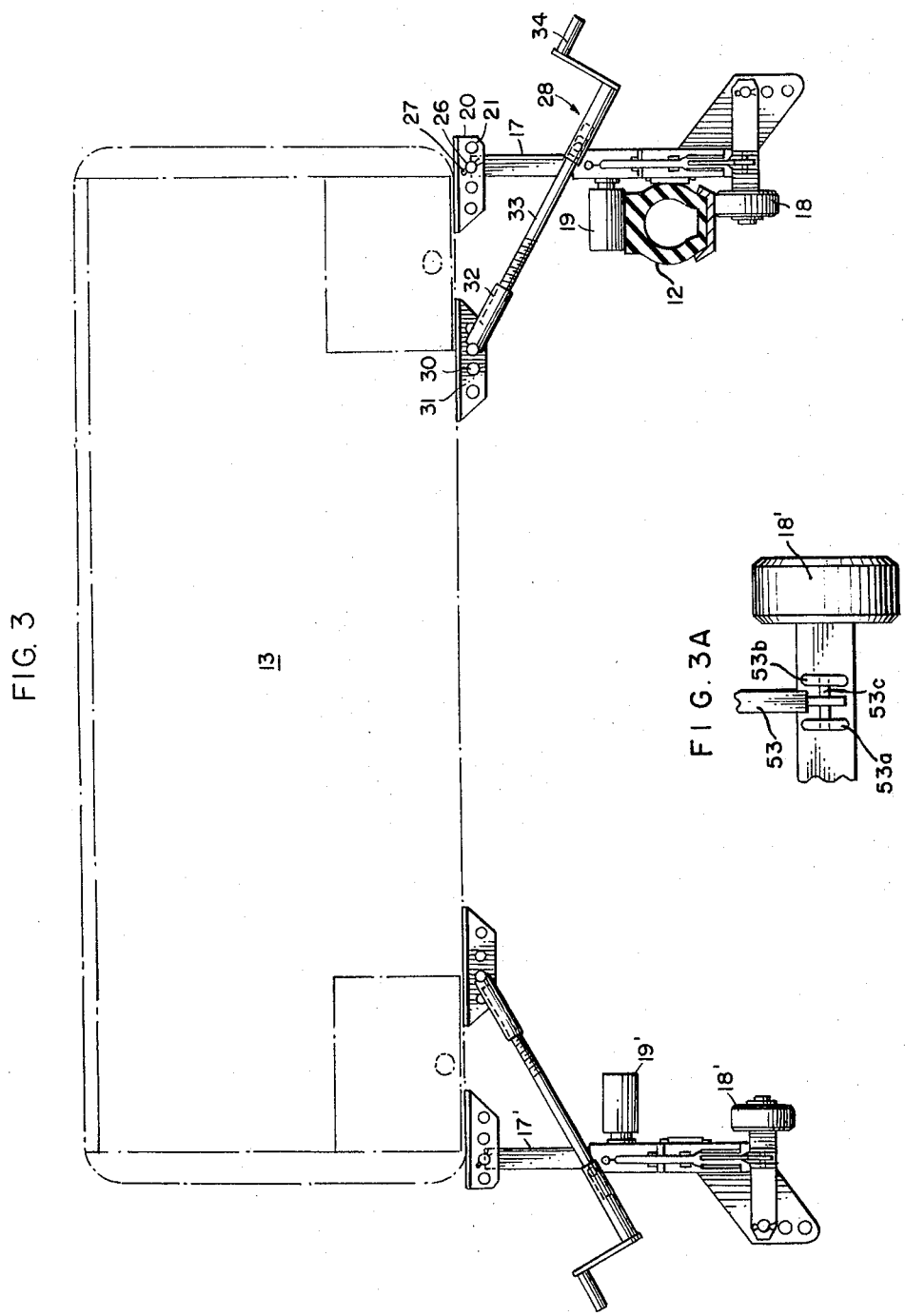

INVENTORS:
RICHARD F. BRISBIN
EDWARD J. SEDLACEK

BY *Dawson, Tilton, Fallon, Lungmus & Alexander*
ATT'YS

United States Patent Office 3,279,824
Patented Oct. 18, 1966

3,279,824
TRUCK HITCH
Richard F. Brisbin, Mount Vernon, and Edward J. Sedlacek, Cedar Rapids, Iowa, assignors to Highway Equipment Company, Cedar Rapids, Iowa, a corporation of Iowa
Filed Sept. 24, 1964, Ser. No. 399,044
4 Claims. (Cl. 280—460)

This invention relates to a truck hitch, and, more particularly, to a hitch adapted to interconnect a truck with a rearwardly disposed spreading unit.

A particular advantage of the inventive hitch is that it eliminates the need for a special hitch on the rear of the truck in order to tow a spreading unit such as a paver. Dump body trucks are used in a variety of applications, and the installation of special hitches can be time-consuming. With the inventive arrangement, contractors no longer have to go to the trouble and expense of putting hitches on their trucks, and using rented trucks creates no problem.

It is therefore an object of the invention to provide a hitch or connection for a truck which is provided as part of the towed unit—in the illustration given, as part of the spreading unit.

Another object of the invention is to provide a novel hitch for a truck wherein the hitch is equipped with rollers for engaging a toroidal or annular portion of the truck rear wheels whereby installation of the hitch requires no connection to the truck frame.

Still another object of the invention is to provide a truck hitch for a material spreader, or the like, wherein the hitch is provided as an integral part of the spreader and where the hitch further includes uniquely disposed roller means for engaging an annular portion of a truck rear wheel for a dynamic, stablized connection.

Other objects and advantages of the invention will be seen in the details of construction and operation set down in this specification.

The invention is explained in conjunction with an illustrative embodiment in the accompanying drawing, in which—

FIG. 1 is a fragmentary perspective view of the rear portion of a truck having a material spreader attached thereto by means of the inventive hitch;

FIG. 2 is another fragmentary perspective view of the arrangement of FIG. 1 but wherein the spreader is elevated slightly relative to the ground to be in transport position from one spreading site to another;

FIG. 3 is a top plan view of the hitch portion of the spreader seen in the preceding views, but on enlarged scale;

FIG. 3A is an enlarged fragmentary view of a portion of FIG. 3;

Figure 4:
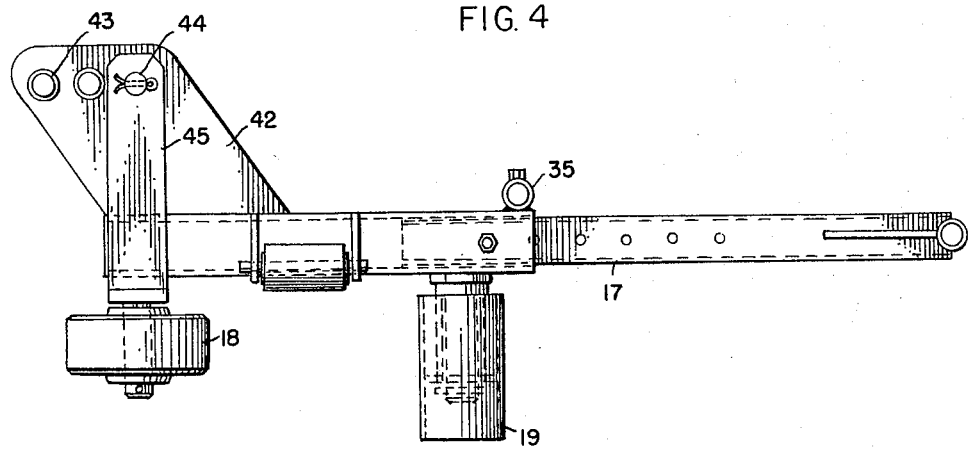
FIG. 4 is an enlarged plan view of one of the right-hand arms of the hitch portion of the spreader seen in the preceding views.

In the illustration given, and with particular reference to FIG. 2, the numeral 10 designates generally a truck, which is seen to be equipped with the usual tiltable dump box 11 and rear wheels as illustrated by the left rear wheel 12. The numeral 13 designates generally a self-balancing type of spreading unit as for paving material, which is seen in FIG. 2 to be equipped with chains 14 securing the unit above the ground, the forward end of the chain being secured to the dump box 11 well above the rear wheels 12.

Referring now to FIG. 1, which shows the spreading unit 13 supported on the ground and the dump box 11 tilted—this being the disposition for spreading—it will be seen that the rear wheel 12 is equipped with an annular rim 15 adapted to support a pair of tires 16.

*Basic structure and operation*

The inventive hitch is seen to include on each side of the spreader unit 13 and arm 17 carrying a forward roller 18 and rear rollers 19 and 19a. The rollers 18, 19 and 19a are seen to bear respectively against the interior of the rim 15 and the periphery of the tire 16 and clampingly engage the tire. Thus, the arm remains in a given disposition notwithstanding the fact that the wheel 12 is rotating to tow the spreader unit 13 forwardly. It will be appreciated that since the forward and rear rollers clampingly engage the tire, the spreading unit 13 may be equally well pushed as in backing the truck 10, and can also be operated around curves.

*Inventive structure in detail*

Reference to FIG. 3 reveals that the right-hand and left-hand arms 17 and 17', respectively, are symmetrically placed on the spreader unit 13 and are mirror images of each other. Therefore, in the following description, only one arm and its associated components will be described.

For the purpose of mounting the arm 17, which may be an elongated square tube, the unit 13 is equipped with a bracket 20 having a plurality of aligned mounting holes 21 disposed therein. The bracket 20 for this purpose is equipped with forwardly-extending flanges as at 22 and 23 (see FIG. 1). Positioned between the flanges 22 and 23 is a vertical tube 24 provided at the rear end of the arm 17 (see FIG. 5) and which is stabilized by means of gussets 25. An elongated pin 26 extends through the aligned openings 21 in the tube 24 to releasably secure the arm 17 to the bracket 20, and the pin 26 is maintained in place by means of a cotter pin 27. Thus, the arm 17 is adapted to pivot over a horizontal arc to permit precise positioning of the roller 18 relative to the rim 15.

Figure 6:
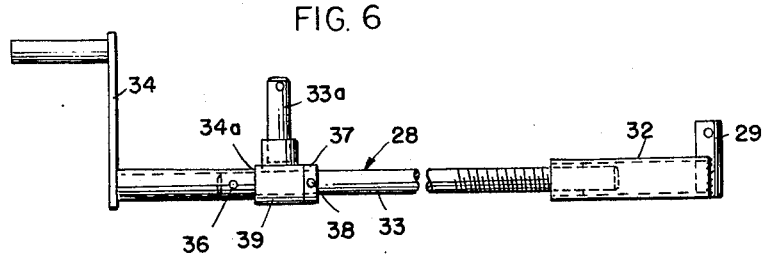
FIG. 6 is an enlarged elevational view of the jack screw connection on each arm, being in enlarged scale relative to the showing in FIG. 3.

The arm 17 is immobilized in the position shown by means of a jack screw generally designated 28 and which can be seen in enlarged scale in FIG. 6. The rear end of the jack screw is equipped with a depending pin as at 29 which is received within one of the holes 30 provided in the forwardly-extending bracket 31 (see FIG. 3). The female portion of the jack screw is designated 32 and constitutes a pivot arm in that it carries the depending pin member 29. Threadedly received within the pivot arm 32 is the male portion 33 of the jack screw, which, at its forward end, is equipped with a crank 34. Intermediate the ends of the male portion 33 of the jack screw 28 is provided a pivot shaft 33a which is slidably and rotatably received within a sleeve 35 (see FIG. 4) provided on the arm 17. The pivot shaft 33a is confined in place by a shoulder 34a provided as part of the crank handle 34, the crank handle 34 being pinned to the male portion 33 as at 36 (see FIG. 6). The pivot shaft 33a is constrained against movement in the other direction by a pin as at 38. It will be noted that the pivot shaft 33a is equipped with an integral collar as at 39, so that the male portion 33 may be moved relative to the female pivot portion 32 so as to swing the arms 17 and 17' in and out as needed for the proper engagement of the rollers 18 and 19, 19a with the rear wheel 12.

The arm 17 in the portion carrying the sleeve 35 is equipped with a bracket 40 constituting a support for the upper roller 19 and the lower roller 19a. Each of these rollers is cantilever mounted on suitable shafts as at 41 so that the rollers 19 and 19a bear against the periphery of the tire 16.

Figure 5:
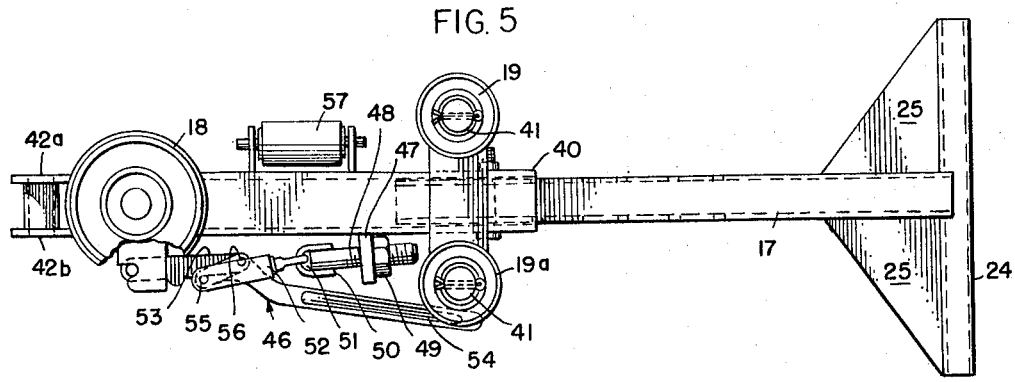
FIG. 5 is a side elevational view of the hitch arm seen in FIG. 4.

At the extreme forward end of the arm 17 a laterally outwardly extending bracket 42 is provided, being made up of parallel plates 42a and 42b (compare FIGS. 4 and 5). Each plate 42a and 42b is equipped with aligned openings as at 43 in which a pin 44 may be received for the purpose of supporting the shaft bracket 45 for carrying the wheel 18 in cantilever fashion. Through the provision of the bracket 42, the wheel 18 may be moved forwardly or rearwardly so as to accommodate the hitch to different sized truck tires. Further, the shaft bracket 45 is pivotally mounted on the plates 42a and 42b, and the bracket 45 is immobilized by means of an over-center lever generally designated 46 (see especially FIG. 5). For this purpose, the arm 17 is equipped with a depending lug as at 47 in which a stud 48 is received. A lock-nut 49 is received on the threaded stud 48 to limit forward movement of the stud 48. The stud 48 at its forward end is equipped with an integral fitting 50 providing an eye 51 in which a lever link 52 is pivotally received. The lever link 52 is connected to a rearwardly-extending stationary link 53 provided on the underside of the bracket 45 by means of a lever member 54. Link 53 is attached to upwardly extending fingers 53a and 53b mounted on bracket 45 by means of pin 53c, which extends through link 53 and fingers 53a and 53b (see FIG. 3A). The connections between the lever member 54 and the links 52 and 53 occur at 55 and 56, respectively, and it will be seen that downward pivotal movement of the lever 54 about its pivot point at 56 at first tends to pull the roller 18 towards rollers 19 and 19a into tighter engagement with the inside of the rim 15 and further downward movement swings the roller 18 forwardly and away from its bearing engagement with the inside of the rim 15.

The arm 17 is further equipped with a roller 57 positioned between the rollers 18 and 19, with its axis extending horizontally also but perpendicularly to the axes of the rollers 18 and 19. It is the function of the roller 57 to bear against the side of the tire 16 to further stabilize the hitch.

In operation, the hitch incorporates two adjustable pull arms 17, 17' attached to the front side of the spreading unit 13. Single rollers 18, 18' at the outer ends of the pole arms are located so that they fit inside the truck outer rear dual rims 15. These rollers 18, 18' are locked in position by a screw adjustable, over-center lever control generally designated 46. Two rollers 19, 19a are attached to each pole arm 17 in such a way that they are positioned to the rear of the outside dual tire and run against the tire tread. A side roller 57 is also attached to each pole arm in such a way as to roll against the tire side wall and thus keeps the pole arm from scuffing the tires.

Both pull arms have screw type adjustment controls to position them in or out to fit various overall tire width trucks. The distances between rollers 18, 18' at the outer end of the pull arms 17, 17' and the dual rollers 19, 19a, 19', etc., that run against the tire tread are adjustable so that the spreading unit 13 can be hooked up to trucks that have different sized tires and distances from rear axle to dump body lift.

Also, included with the inventive hitch is a forwardly-extending lift chain 14a (see FIG. 2) and two standard side lift chains 14, so that the unit can be raised by the truck dump box 11 for transporting.

While in the foregoing specification a detailed description of an embodiment of the invention has been set down for the purpose of illustration, many variations in the details herein given may be made by those skilled in the art without departing from the spirit and scope of the invention.

We claim:
1. A truck hitch adapted for use with the dual rim rear wheels of a truck, comprising a spreader equipped with a pair of forwardly extending arms, a first roller adjacent the forward end of each arm, a second roller spaced rearwardly of said first roller, said first roller being equipped with a bracket pivotally mounted on its associated arm for movement in a generally horizontal arc, and an over-center lever connected between said bracket and said arm for immobilizing said bracket.

2. The hitch of claim 1 in which said first and second rollers are each cantilever-mounted on its associated arm.

3. The hitch of claim 1 in which said arm is equipped with a bracket pivot plate equipped with a plurality of bracket pivot mounts, and said lever is equipped with means for elongating the same whereby the said hitch is adapted to be installed on truck wheels of different toroidal thickness.

4. The hitch of claim 1 in which each arm is equipped with an adjustable link interconnecting said arm to said spreader at a point intermediate of said arms for immobilizing said arms.

References Cited by the Examiner
UNITED STATES PATENTS

| | | | |
|---|---|---|---|
| 2,874,620 | 2/1959 | Mentes | 94—44 |
| 2,944,837 | 7/1960 | Fotheringham | 280—503 |
| 3,138,392 | 6/1964 | Holland | 280—460 |
| 3,208,359 | 9/1965 | Odell | 94—44 |

JACOB L. NACKENOFF, *Primary Examiner.*